US012465976B2

(12) United States Patent
Gronle (10) Patent No.: US 12,465,976 B2
(45) Date of Patent: Nov. 11, 2025

(54) METHOD FOR OPERATING A DEVICE FOR ADDITIVE MANUFACTURING OF A THREE-DIMENSIONAL OBJECT

(71) Applicant: TRUMPF Laser—und Systemtechnik GmbH, Ditzingen (DE)

(72) Inventor: Marc Gronle, Stuttgart (DE)

(73) Assignee: TRUMPF LASER-UND SYSTEMTECHNIK GMBH, Ditzingen (DE)

( * ) Notice: Subject to any disclaimer, the term of this patent is extended or adjusted under 35 U.S.C. 154(b) by 680 days.

(21) Appl. No.: 17/719,427

(22) Filed: Apr. 13, 2022

(65) Prior Publication Data

US 2022/0241861 A1    Aug. 4, 2022

Related U.S. Application Data

(63) Continuation of application No. PCT/EP2020/078840, filed on Oct. 14, 2020.

(30) Foreign Application Priority Data

Oct. 16, 2019 (DE) ..................... 10 2019 127 952.6

(51) Int. Cl.
*B22F 10/368* (2021.01)
*B22F 10/28* (2021.01)
(Continued)

(52) U.S. Cl.
CPC ............ *B22F 10/368* (2021.01); *B22F 10/28* (2021.01); *B22F 12/41* (2021.01); *B22F 12/49* (2021.01);
(Continued)

(58) Field of Classification Search
CPC ........ B22F 10/368; B22F 12/49; B22F 12/41; B22F 12/90; B22F 10/28; B22F 2201/10; B22F 2203/11; B33Y 10/00
(Continued)

(56) References Cited

U.S. PATENT DOCUMENTS 6,995,334 B1    2/2006   Kovacevic et al.
9,031,688 B2    5/2015   Himeno et al.
(Continued)

FOREIGN PATENT DOCUMENTS

DE    102017202725 B3    7/2018
DE    102018200721 A1    7/2019
(Continued)

*Primary Examiner* — Elizabeth M Kerr
*Assistant Examiner* — Simpson A Chen
(74) *Attorney, Agent, or Firm* — LEYDIG VOIT & MAYER LTD.

(57) ABSTRACT

A method for operating a manufacturing device for additive manufacturing of a three-dimensional object includes irradiating a subregion of a build material within a building zone in which a beam of a beam source is directed onto the build material by a scanning unit. An amount of energy introduced is chosen such that the build material is solidified, so that a subregion of the three-dimensional object to be manufactured is formed. The method further includes controlling at least one irradiation parameter that characterizes the irradiation such that the irradiation parameter lies in a process window that changes location-dependently over an area of the building zone. The process window presets a relationship between a sensor signal detected by a sensor unit and permissible values for the irradiation parameter.

19 Claims, 5 Drawing Sheets

(51) Int. Cl.
*B22F 12/41* (2021.01)
*B22F 12/49* (2021.01)
*B22F 12/90* (2021.01)
*B33Y 10/00* (2015.01)

(52) U.S. Cl.
CPC .............. *B22F 12/90* (2021.01); *B33Y 10/00* (2014.12); *B22F 2201/10* (2013.01); *B22F 2203/11* (2013.01)

(58) Field of Classification Search
USPC ..................................................... 219/121.62
See application file for complete search history.

(56) References Cited

U.S. PATENT DOCUMENTS

| | | | |
|---|---|---|---|
| 11,002,649 B1* | 5/2021 | Boyce | G01N 3/04 |
| 2014/0271328 A1* | 9/2014 | Burris | B23K 26/034 |
| | | | 419/53 |
| 2015/0049875 A1* | 2/2015 | Zhang | H04B 17/336 |
| | | | 381/58 |
| 2015/0144604 A1* | 5/2015 | Huang | B23K 26/04 |
| | | | 219/121.81 |
| 2015/0219444 A1 | 8/2015 | Bamberg et al. | |
| 2016/0158889 A1* | 6/2016 | Carter | C30B 11/006 |
| | | | 219/76.1 |
| 2017/0266762 A1 | 9/2017 | Dave et al. | |
| 2018/0178285 A1 | 6/2018 | Martin et al. | |
| 2018/0229302 A1* | 8/2018 | Furrer | B29C 64/153 |
| 2018/0281286 A1* | 10/2018 | Vilajosana | B29C 64/393 |
| 2019/0015933 A1 | 1/2019 | Coeck | |
| 2019/0178285 A1 | 6/2019 | Mcgregor | |
| 2019/0255654 A1* | 8/2019 | Beckett | B23K 26/034 |
| 2019/0375049 A1* | 12/2019 | Werner | B29C 64/393 |
| 2020/0023585 A1 | 1/2020 | Wiesner et al. | |
| 2020/0086388 A1* | 3/2020 | Zediker | B23K 26/032 |
| 2020/0242496 A1* | 7/2020 | Salasoo | B22F 10/20 |

FOREIGN PATENT DOCUMENTS

| | | |
|---|---|---|
| DE | 102018203444 A1 | 9/2019 |
| EP | 2905592 B1 | 8/2017 |
| EP | 3210697 A1 | 8/2017 |
| EP | 3472569 A1 | 4/2019 |
| EP | 3542928 A1 | 9/2019 |
| WO | WO 2017085468 A1 | 5/2017 |
| WO | WO 2017143077 A1 | 8/2017 |
| WO | WO 2017216059 A1 | 12/2017 |

* cited by examiner

METHOD FOR OPERATING A DEVICE FOR ADDITIVE MANUFACTURING OF A THREE-DIMENSIONAL OBJECT

CROSS REFERENCE TO RELATED APPLICATIONS

This application is a continuation of International Application No. PCT/EP2020/078840 (WO 2021/074188 A1), filed on Oct. 14, 2020, and claims benefit to German Patent Application No. DE 10 2019 127 952.6, filed on Oct. 16, 2019. The aforementioned applications are hereby incorporated by reference herein.

FIELD

An aspect of the present invention relates to a method for operating a device for additive manufacturing of a three-dimensional object by applying layer by layer and selectively solidifying a build material, in particular a powdered build material. Another aspect of the present invention relates to a method for creating a process window for carrying out the aforementioned method.

BACKGROUND

For the additive manufacturing of a three-dimensional object, so-called "Selective Laser Sintering" (SLS) or "Selective Laser Melting" (SLM) methods are known. For this purpose, a powdered build material, for example metal or ceramic powder, is irradiated in the object forming chamber with an electromagnetic radiation from a beam source, in particular with a laser light. A thin layer of powder is applied on the building zone of the chamber and is sintered or melted by the laser light for manufacturing the object. The manufacturing of the object in this case takes place step by step; layers of powder are applied one after the other and in each case sintered or melted. Between the production steps, the powdered build material is applied to or coated onto the building platform by an application device, for example a wiper, a roller, a brush or a blade.

Methods for optimizing the process parameters of an additive manufacturing method are disclosed in the publications DE 10 2018 200 721 A1 and DE 10 2018 203 444 A1.

DE 10 2018 200 721 A1 discloses a method by means of which locationally adapted process parameters are established over the building zone in dependence on the component geometry to be locally created in each case.

SUMMARY

Embodiments of the present disclosure provide a method for operating a manufacturing device for additive manufacturing of a three-dimensional object. The method includes irradiating a subregion of a build material within a building zone in which a beam of a beam source is directed onto the build material by a scanning unit. An amount of energy introduced is chosen such that the build material is solidified, so that a subregion of the three-dimensional object to be manufactured is formed. The method further includes controlling at least one irradiation parameter that characterizes the irradiation such that the irradiation parameter lies in a process window that changes location-dependently over an area of the building zone. The process window presets a relationship between a sensor signal detected by a sensor unit and permissible values for the irradiation parameter.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Devices for additive manufacturing of a three-dimensional object can have an object forming chamber in which the object to be produced is created step by step. Provided in the object forming chamber is a working area which has a building zone for manufacturing the three-dimensional object.

Embodiments of the present invention provide a method for operating a manufacturing device for additive manufacturing of a three-dimensional object. The method relates to manufacturing devices which have at least one beam source and a scanning unit. In particular, however, the method may be carried out on manufacturing devices which have at least two beams sources and two scanning units. The scanning unit or scanning units is/are designed and arranged to direct in each case a beam of the respective beam source, controlled by the respective scanning unit, onto various target points on the building zone. In other words, the beam can be guided or directed by the scanning unit onto various points of the building zone.

Manufacturing devices having two or more beam sources are meant in the present case to include manufacturing devices which have a single device for the actual generation of a beam, this beam in turn being divided into a number of partial beams, for example by means of a beam splitter. The individual partial beams of the divided beam then represent the number of beam sources according to embodiments of the present invention.

The manufacturing device also comprises a sensor unit. The sensor unit has a monitoring region, the sensor unit being designed to detect the radiation emitted from the building zone in the monitoring region. The sensor unit may for example be designed as an on-axis sensor unit. The monitoring region of the sensor unit may however also be directable independently of the target point of the beam source or scanning unit. For example, the sensor unit may be an on-axis sensor unit of a second scanning unit with or without a second beam source. The sensor unit may also have a locationally fixed monitoring region. Such a sensor unit can for example detect with its monitoring region the entire building zone. It may also be provided that a number of the sensor units just described and/or further sensor units are present in combination and are used in carrying out the methods.

Embodiments of the present invention can make it possible to operate the aforementioned manufacturing device with accurate setting of the process parameters. Correspondingly, the Method has the Following Steps: irradiating a subregion of the build material within the building zone in which the beam of the beam source is directed onto the build material by means of the scanning unit. In this irradiating operation, the amount of energy introduced is chosen such that the build material is solidified. The solidifying may take place by sintering the powdered build material or by local melting (formation of a melt pool) and subsequent solidifying. As a result, a subregion of the three-dimensional object to be manufactured is formed.

During this manufacturing of the subregion of the three-dimensional object, at least one irradiation parameter that characterizes the irradiation is chosen locally in each case such that it lies in a process window that changes location-dependently over the area of the building zone. A process window is consequently taken to mean a relationship which presets permitted values for the respective irradiation parameter in dependence on the detected sensor signal.

In other words, the process window presets a relationship between a sensor signal detected by the sensor unit and permissible values for the irradiation parameter. For example, it may therefore be provided that the sensor unit detects the temperature at the irradiated point (for example the local temperature of the melt pool, that is to say the pool of melted build material) and that the process window presets in dependence on this temperature a permissible value or a range of values for the irradiation parameter, which is maintained when conducting the process.

It is not known in the prior art that a process window presets a relationship between a sensor signal detected by the sensor unit and permissible values for the irradiation parameter. The process window presets as it were according to the position on the building zone different selection possibilities for permissible values for the irradiation parameter, and the value of the irradiation parameter that is to be used is selected from these values based on the sensor signal detected by the sensor unit. At one and the same position on the building zone, the process window therefore possibly presets a number of different values for the irradiation parameter, the one to be used being selected on the basis of the sensor signal locally detected by the sensor unit.

In the case of the method according to embodiments of the present invention, it may be provided that the process window that changes location-dependently over the area of the building zone additionally changes in dependence on types of subregion in the area of the objects. Therefore, specific types of subregion are defined in the building zone and in these types of subregion subregion-type-dependent relationships between irradiation parameters and a sensor signal detected by the sensor unit are preset by the process window.

The types of subregion in the area of the objects may comprise: contour and/or upskin and/or downskin and/or inskin subregions with predetermined heat dissipation properties, in particular of a number of the layers of powder that have already solidified under a subregion, and/or portions of the aforementioned subregions in dependence on the form of the contour. A contour region is a region that forms the outer region of a solidified region in the area; this is separately exposed or irradiated in a so-called contour pass, in order to obtain a smooth outer contour in the plane. Upskin regions are regions which form an upper limit of a solidified region, which as it were form an upper "skin" or boundary surface. In the layers lying thereunder the material is solidified, in the layer lying next thereover there follows unsolidified material. By contrast, downskin regions are regions which form a lower limit of a solidified region, which as it were form a lower "skin" or boundary surface. In the layers lying thereover the material is solidified, in the layer lying next thereunder there is unsolidified material. Inskin regions in turn lie within solidified material, in other words the material lying in the plane alongside is solidified (otherwise the region would be a contour subregion), the material lying thereunder has been solidified in the last exposure pass (otherwise the subregion would be a downskin subregion) and the material following above in the next layer will be solidified in the next layer-by-layer exposure pass (otherwise the subregion would be an upskin subregion). The subregions may also be a contour subregion and a further one of the three further types of subregion. A further type of subregion may be a supporting subregion, which concerns a material portion to be solidified that is subsequently removed from the finished workpiece or object. In a supporting subregion, the requirements for the quality of the material are low and the irradiation can be adapted correspondingly. In the other subregions, adjoining or not adjoining solidified material or powdered build material influences the heat dissipation properties, and the irradiation parameters should advantageously be adapted correspondingly.

The process window that changes location-dependently over the area of the building zone may be formed while taking into account at least one machine parameter, in particular one of the following machine parameters:
  the angle at which the beam impinges on the building zone,
  the inert gas flows, preferably the speed, volume and homogeneity of the inert gas flow or the type of inert gas,
  the beam profile of the laser beam used, preferably the projection of the laser beam onto the powder bed, and/or
  calibration measurements on calibration components, preferably at the position of fixed points.
In this way, various influences of the machine configuration can be taken into account.

It may also be provided that the process window that changes location-dependently over the area of the building zone is additionally formed while taking into account at least one parameter of the powdered build material, in particular one of the following parameters of the build material:
  the chemical composition,
  the average grain size and/or
  the grain size distribution.
It is conceivable with respect to the dependence of the irradiation parameter on the detected sensor signal for example that the power of the beam source or the amount of energy introduced into the powdered build material by means of the beam is set in dependence on the sensor signal, and therefore is in a range of values preset by the process window. On the other hand, the traversing speed of the laser or the irradiated point may for example also be preset in dependence on the temperature of the melt pool or another sensor signal. A further example of a possible preset parameter may also be the pulse duration in the case of pulsed irradiation.

It is also conceivable that a manufacturing device with a number of beam sources is used and that, for each of the beam sources, their own process windows are used for establishing the permissible ranges of values for the irradiation parameters of the respective beam sources.

It may also be provided in the case of the present method that, during the irradiation, a number of irradiation parameters that characterize the irradiation lie in each case in parameter-specific process windows. In other words, a number of parameters which characterize the local irradiation may be chosen location-dependently in such a way that they lie in a respective process window that changes location-dependently over the area of the building zone. Various process windows may therefore be provided for the various irradiation parameters.

The respective process windows in this case preset a relationship between a sensor signal detected by the sensor unit and permissible values for the respective irradiation parameter.

It may also be provided that, in addition to the sensor signals, the choice of the other irradiation parameters also influences the permitted process window for a specific irradiation parameter. The process windows may therefore preset a permissible range of values for irradiation parameters in dependence on sensor signals and further irradiation parameters. In this case, these relationships are also preset varyingly over the area of the building zone by the process window.

For example, it may be provided that, in addition to the temperature of the melt pool (sensor signal), the traversing speed of the beam (irradiation parameter) also restricts the permitted values for the power of the radiation source.

It may also be provided that the manufacturing device comprises a number of sensor units and the process window of the irradiation parameter presets the range of the permitted values of the irradiation parameter in dependence on a number of sensor signals that are detected by the various sensor units. In this case, these relationships are also preset varyingly over the area of the building zone by the process window.

Therefore, at least one irradiation parameter that characterizes the irradiation, in particular a number of irradiation parameters that characterize the irradiation, may be chosen locally in each case such that it lies/they lie in a process window that changes location-dependently over the area of the building zone, the process window (or in the case of a number of irradiation parameters the process windows) presetting in each case a relationship between a number of sensor signals detected by the sensor units and permissible values for the irradiation parameter or parameters. It may in this case be provided that at least one sensor unit moves its monitoring region along with the irradiated point (directed directly onto the irradiated point or offset in relation to it), it may also be provided that a further sensor unit has a stationary monitoring region.

It may similarly be provided in the present case that the process window is defined by locationally preset fixed points. These locationally preset fixed points are distributed over the building zone, but they do not correspond to the entire area of the building zone. At the respective fixed points, a relationship between one or more detected sensor signals (possibly also further irradiation parameters) and permissible values for the irradiation parameter or parameters is defined. As explained above, the permissible values of the irradiation parameter at these fixed points may also depend on the values of one or more of the other irradiation parameters. The method may also comprise that, at points on the building zone that deviate from these locationally preset fixed points, the corresponding relationship is determined by linear interpolation of the relationships between the fixed points. For this purpose, the distance of a point lying between a number of fixed points from these fixed points may be used in order to weight the process windows of the surrounding fixed points and thus arrive at a local process window at the point lying between the fixed points. For determining the local process window at the point lying between the fixed points, typically the three fixed points lying nearest to this point are taken into account, and a linear interpolation between their process windows is carried out. The weighting of the fixed points surrounding a point lying between a number of fixed points may also take place in the course of the interpolation by way of triangles set up between the point and the fixed point, a respective fixed point being assigned the triangle set up lying opposite it with respect to the point.

According to embodiments of the present invention, it may be provided in particular that a locationally variable process window, for example according to one of the types described here, presets at least the traversing speed of the laser beam as an irradiation parameter in dependence on a detected sensor signal.

According to embodiments of the present invention, it may be provided in particular that a locationally variable process window, for example according to one of the types described here, presets at least the power of the laser beam as an irradiation parameter in dependence on a detected sensor signal.

According to embodiments of the present invention, it may be provided in particular that a locationally variable process window, for example according to one of the types described here, presets at least the pulse duration of the laser beam as an irradiation parameter in dependence on a detected sensor signal.

A further example of a corresponding radiation parameter are values of the scanning unit.

A further example of a corresponding irradiation parameter is a beam diameter.

It may be provided in particular that the process window presets the corresponding irradiation parameter in dependence on at least one sensor signal that characterizes the melt pool. "Sensor signals that characterize the melt pool" in this sense comprise at least the local temperature at the momentarily irradiated point (before melting or else the temperature of the melt pool), the local temperature at a measuring point preceding the irradiated point, the local temperature at a measuring point following the irradiated point, the cooling profile of an already irradiated point and/or the heating behavior of a point toward which the irradiated point moves.

The sensor signal which is used for determining the permissible values of the irradiation parameter may be determined for example by the monitoring region of the sensor unit being made to precede the movement of the beam or the movement of the target point of the beam during the irradiating operation. Preceding is taken here to mean that the monitoring region passes over the later-irradiated region on the building zone before the beam. In this case, the monitoring region may be guided at a constant distance from the target point of the beam. It is however also conceivable that the monitoring region is moved with a specific time lead in relation to the target point of the beam. It is meant by this that the monitoring region always passes a point on the building zone with exactly the same time offset as the target point of the beam. On the basis of the detected signals of the sensor unit, conclusions can be drawn for example about the conditions, in particular temperature conditions, of the still powdered and not yet solidified build material, and these can then be used within the process window in the "setting" of the suitable irradiation parameters.

It is also possible to determine the sensor signal which is used for determining the permissible values of the irradiation parameter by means of a monitoring region of the sensor unit that is made to follow the movement of the beam during the irradiating operation. "Following" is taken here to mean that the monitoring region follows the movement pattern of the beam. The monitoring region may in this case follow the beam at a defined distance. The distance may in this case be temporally or geometrically defined. The monitoring region may therefore be guided over the building zone with a specific time offset following the beam or be moved at a specific spatial distance from the beam, following it. On the basis of the detected signals of the sensor unit, conclusions can be drawn for example about the conditions, in particular temperature conditions, of the solidifying or cooling build material, and these can then be used within the process window in the "setting" of the suitable irradiation parameters.

The locational adaptation of the process window makes it possible to take into account non-uniform conditions over the area of the building zone. Even if the sensor signals at different locations of the building zone are identical, there may still be different conditions at different locations of the building zone or different irradiation parameters may be necessary to achieve the same results. This may be caused for example by different angles at which the beam impinges on the building zone or by different inert gas flows. The beam profile of the laser beam used may also vary location-dependently. In particular, the flow of the inert gas used may vary location-dependently, and consequently lead to different convective heat dissipation conditions at different locations of the building zone. It may also be the case that particles which get into the atmosphere above the build material are transported away with different degrees of effectiveness at different locations of the building zone, so that, in spite of the same sensor signals, the energy actually arriving at the building zone may differ at different locations with the same output power of the radiation source. The same conditions (for example the temperature of the melt pool) may also lead to different sensor signals at different locations of the building zone, which is caused for example by different transmission in the optical field. All of these effects can be taken into account by using the method according to embodiments of the present invention.

According to embodiments of the present invention, it may be provided in particular when the process window or the process windows assigned to the individual stock parameters according to one of the following types is/are created.

The creating of a process window (claim 12) for carrying out a method for operating a manufacturing device or for carrying out the irradiation according to one of the embodiments described here may in this case comprise:

building up a number of three-dimensional reference objects by applying layer by layer and selectively solidifying build material within the building zone. In this case, at least one irradiation parameter is in each case changed in the different building operations of the reference objects.

During the building up of the reference objects, one or more irradiation parameters are detected and recorded. In this case, in addition to the values of the respective irradiation parameter, the local position on the building zone is also detected and recorded. Therefore, as it were for each building operation of a reference object, a map which reproduces the respective value of the irradiation parameters used at the various points of the building zone is created over the building zone.

In other words, the method for creating the process window comprises the detecting and recording of one or more irradiation parameters in dependence on the irradiated position on the building zone.

The creating of the process window also comprises the monitoring of the building operation by detecting sensor signals by means of one or more sensor units in dependence on the irradiated position on the building zone and the recording of the sensor signals. In other words, in a way similar to in the case of the irradiation parameters, the sensor signals are also detected and stored in dependence on the respective position on the building zone. Thereafter, the irradiation parameters used and also the detected sensor signals in dependence on the position are thus available for the various positions on the building zone.

The reference objects are also checked. It may therefore be checked whether the building operation on the reference objects has in each case led to a satisfactory result, in particular at which positions on the building zone satisfactory results have been achieved. The fact that different reference objects have been built up and the irradiation parameters thereby changed allows a corridor of values for permissible irradiation parameters for the respective locations on the building zone to be determined. For example, it can be identified if at a specific point with specific power of the laser source the energy input into the build material was no longer sufficient to melt the material completely, and consequently to lead to a defect-free reference object. It may also be provided that the "checking" of the reference objects takes place by a simulation based on the detected irradiation parameters and sensor signals. It may in this case be analytically or numerically determined whether the parameters used and sensor signals received lead to a sufficient satisfactory quality of the achieved reference object. Envisaged in particular however is the physical analysis of the reference objects, for example by sectional images, visual inspection, loading tests and for example further metallurgical methods of investigation.

A location-dependent process window can subsequently be created. This creating of the process window is in this case based on the detected and recorded irradiation parameters and sensor signals and also the result of the checking of the reference objects. The corresponding process window presets a relationship between at least one sensor signal or a number of sensor signals and permissible values for the irradiation parameter or a number of irradiation parameters.

It may be provided that the building zone is divided into fictitious subregions in the creation of the process window. The detected irradiation parameters and sensor signals may then be correspondingly averaged over the respective subregions and a fixed point with a preset relationship between one or more detected sensor signals and permissible values for the irradiation parameter or parameters determined on the basis of the averaged values for each subregion. The fixed points may in this case correspond in their spatial arrangement on the building zone in particular to the respective centroids of the subregions. Consequently, local "outliers" in the measured sensor signals can be "averaged out" and the determination of the process windows is less interference-prone. The subregions used may in particular have a hexagonal form.

It may be provided that, for the determination of the process window for each subregion, a number n of sensor signals are combined in an average-value vector of the length n. Each entry of the vector may in this case correspond to a sensor signal averaged with respect to the subregion. A covariance matrix may also be created in addition to the average-value vector. The covariance matrix in this case describes the respective variance of the individual sensor signals of the average-value vector and also the respective covariances of the sensor signals in relation to one another.

The sensor units used in the methods or one of the sensor units used may be designed as an on-axis sensor unit. The use of a sensor unit with a locationally fixed monitoring region or sensor units with a monitoring region which is movable independently of a radiation source is also possible.

The sensor units may for example be formed by photo-sensitive sensors, for example a photodiode, a camera, a spectrometer and/or a pyrometer.

The creation of the process window can consequently also be summarized by saying that reference building jobs with specific, for example partially already tried-out irradiation parameters are created and the sensor values and irradiation parameters recorded. The values may then be segmented on the basis of their position (formation of the subregions). On the basis of the segmented values, statistical process windows may then be determined. The locational segmentation has the effect that these process windows vary position-dependently. As compared with averaging over the entire building zone, a more accurate process window is hereby achieved and local conditions of the building zone can be taken into account.

The detection and recording of the sensor signals and irradiation parameters typically takes place at a frequency in the range of 25-600 kHz.

Further details and advantageous configurations can be taken from the following description, on the basis of which exemplary embodiments of the present invention are described and discussed in more detail.

Figure 1:
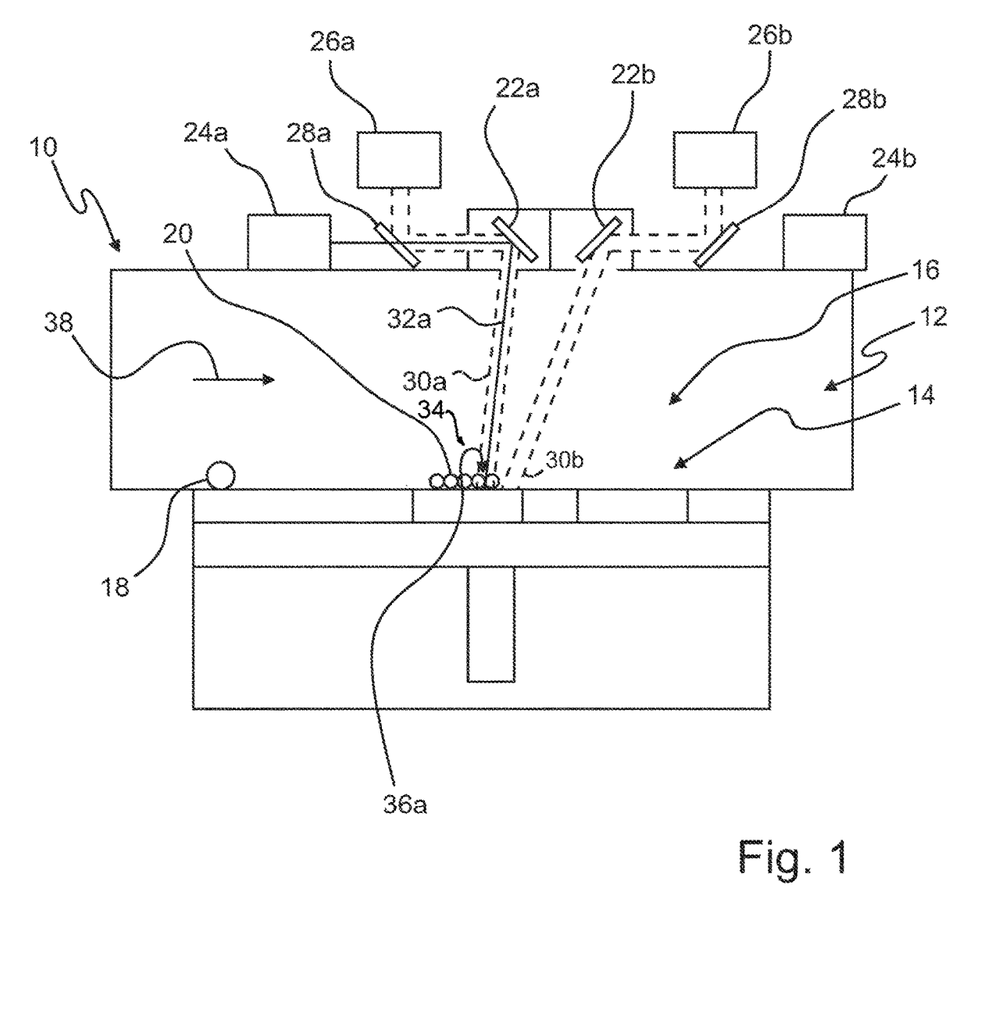
FIG. 1 shows a schematic view of a manufacturing device for the additive manufacturing of a three-dimensional object on which the methods according to embodiments of the present invention are carried out.

Shown in FIG. 1 is a manufacturing device 10, on which the method according to embodiments of the present invention is carried out. The device 10 has an object forming chamber 12. Arranged in the object forming chamber 12 is a working area 14, which has a building zone 16. Similarly arranged in the object forming chamber 12 is an application device 18, which in the present example is designed in the form of a roller, but may for example also be formed by a doctor blade.

Powdered build material 20, which in the present case is arranged in the manner of layers on the building zone 16, is only represented schematically and in certain regions, the representation being greatly enlarged. For each layer-by-layer building operation, typically between 1 μm and 200 μm, in particular between 10 μm and 100 μm, in particular between 20 μm and 40 μm, of powdered build material 20 are distributed over the building zone 16 in the manner of layers by means of the application device 18.

In the present example, the manufacturing device 10 comprises two scanning units 22. A primary scanning unit 22a and a further or secondary scanning unit 22b. The primary scanning unit 22a is assigned a primary beam source 24a and the further or secondary scanning unit 22b is assigned a further or secondary beam source 24b.

It may however also be provided that the method is carried out by means of a manufacturing device 10 with only a single scanning unit 22 and beam source 24.

Correspondingly, the respective scanning units 22 are assigned a respective sensor unit 26 and also a beam splitter 28. By way of the beam splitter 28, on the one hand a monitoring region 30 of the sensor units 26 is guided onto the scanning units 22 and on the other hand a respective beam 32 of the beam sources 24 is coupled into the same optical path. Both sensor units 26 are in the present example designed as on-axis sensor units 26.

The secondary beam source 24b is in this case shown in FIG. 1 in the deactivated state, so that no beam 32b emanates from it.

The primary beam source 24a, by contrast, is shown in FIG. 1 in the activated state, so that a beam 32a emanates from it. The beam 32a is directed by way of the scanning unit 22a onto an object 34 to be built up on the building zone 16, so that it irradiates a target point 36a. The monitoring regions 30 of the sensor units 26 are likewise directed onto the building zone 16 by way of the respective scanning units 22.

It may however also be provided that the method is carried out by means of a manufacturing device 10 which has no secondary beam source 24b. However, a secondary scanning unit 22b, which is independent of the primary beam source 24a and the primary scanning unit 22a and makes it possible to move the monitoring region 30b of the secondary sensor unit 26b over the building zone 16, may also be provided.

The target point 36a of the primary scanning units 22a is in the present case moved along a direction of movement 38 over the building zone 16. The target point 36a is in this case that region on the building zone 16 onto which the scanning unit 22 guides the corresponding beam 32.

The monitoring region 30b is moved so as to precede the beam 32a or the target point 36a. The monitoring region 30a, by contrast, is directed onto the target point 36a and is moved along with it.

Figure 6:
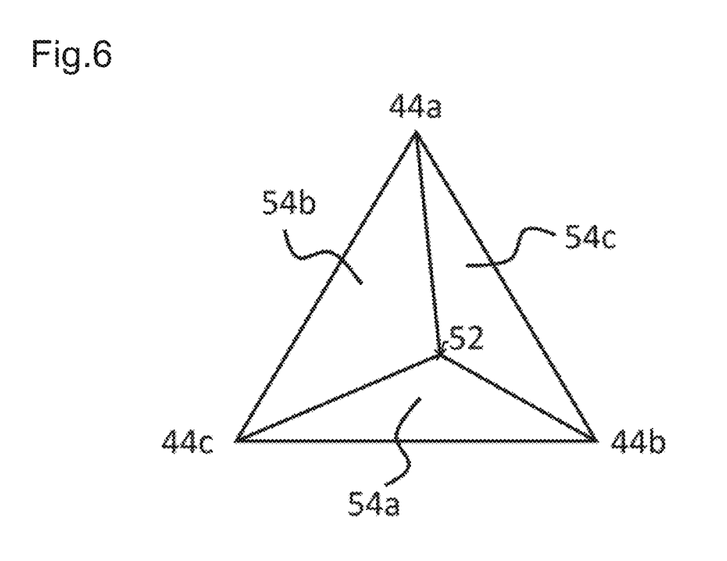
FIG. 6 shows an illustration of a weighting of different fixed points according to some embodiments.
Figure 7:
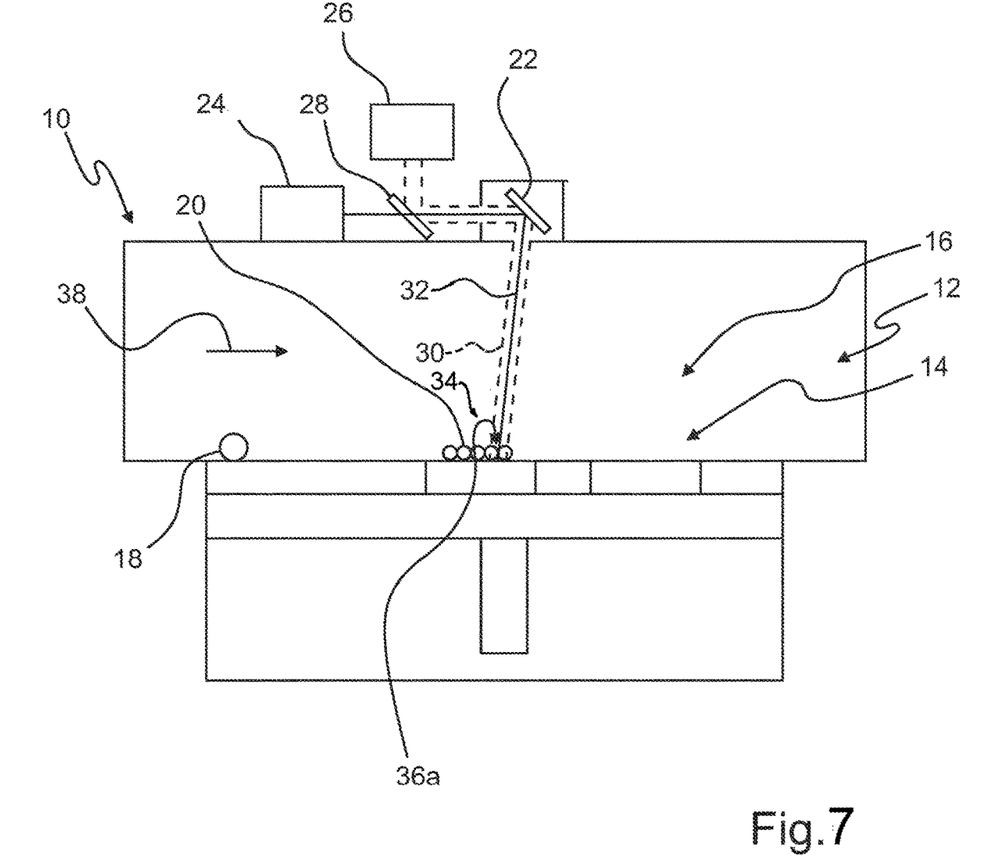
FIG. 7 shows a schematic view of a further manufacturing device for the additive manufacturing of a three-dimensional object on which the methods according to embodiments of the present invention are carried out.

A correspondingly constructed manufacturing device 10 with only one beam source 24, scanning unit 22 and on-axis sensor unit 26 is illustrated in FIG. 6 and can similarly carry out the method.

Figure 2:
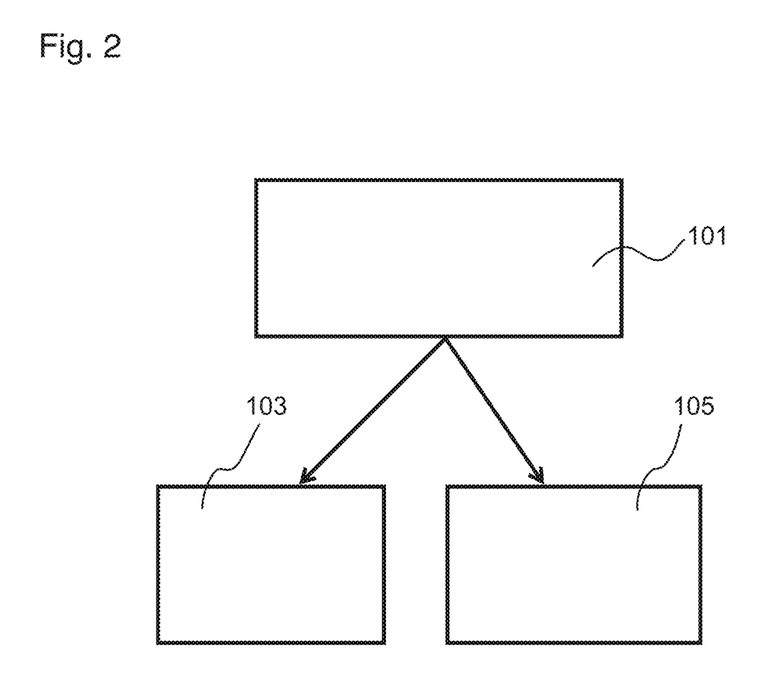
FIG. 2 shows a schematic representation of the sequence of the method for the irradiation according to some embodiments.

In FIG. 2, the sequence of the method for operating the manufacturing device is illustrated.

Block 101 illustrates irradiating of a point on the building zone. Block 103 illustrates moving of the irradiated point. Block 105 illustrates an adaptation of the irradiation parameters that is carried out during the movement.

Figure 3:
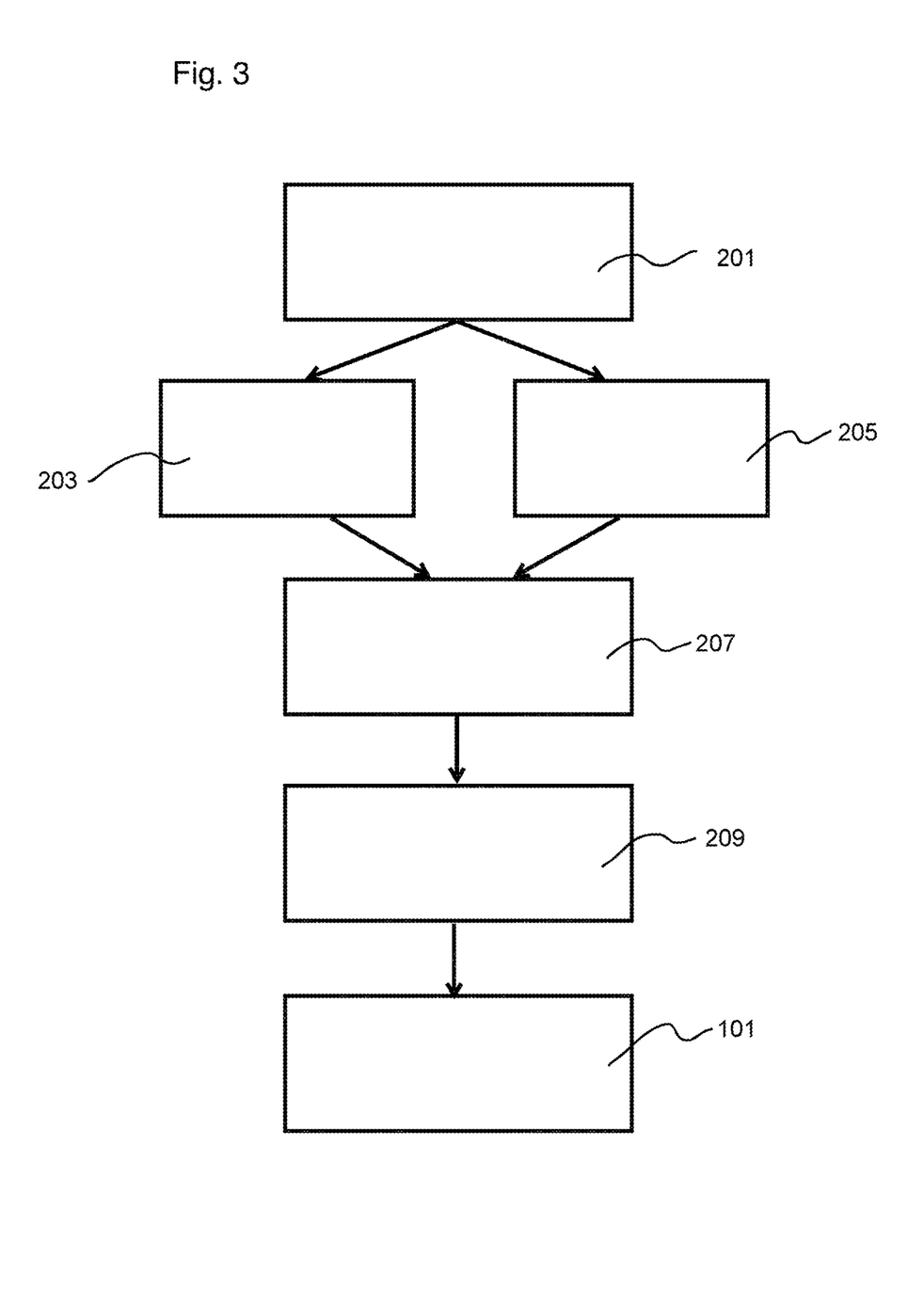
FIG. 3 shows a schematic representation of the sequence of the method for the creation of the process windows according to some embodiments.

In FIG. 3, the sequence of the method for creating a process window is illustrated.

Block 201 illustrates irradiating of a point on the building zone for building up a reference object. Block 203 illustrates detecting and recording of the local irradiation parameters. Block 205 illustrates contemporaneous monitoring of the building operation by detecting and recording the local sensor signals. Block 207 illustrates checking of the reference objects. Block 209 illustrates creating of a location-dependent process window based on the detected and recorded irradiation parameters and sensor signals and also based on the result of the checking of the reference objects.

The process window in this case presets a relationship between sensor signals and permissible values for the irradiation parameter.

As illustrated in FIG. 3 by the link to the block 101, the generated local process windows may be subsequently used to carry out the irradiation with the corresponding irradiation parameters.

Figure 4:
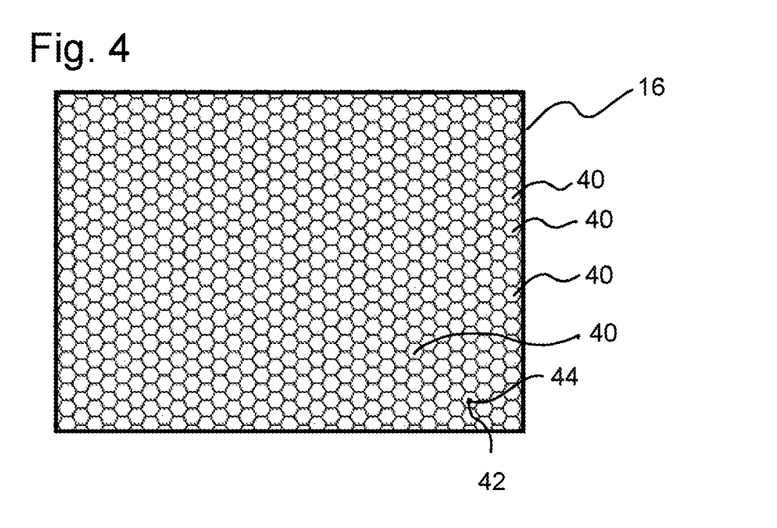
FIG. 4 shows a schematic plan view of the building zone of the manufacturing device, this being divided into individual subregions, according to some embodiments.

In FIG. 4, a view of the building zone 16 is shown, this having been divided into subregions 40. The subregions 40 are in the present case designed in a hexagonal form. Each of the subregions 40 has a centroid 42. The centroids 42 form in each case fixed points 44.

The irradiation parameters and sensor signals detected in steps 203 and 205 have been averaged over the respective subregions 40. On the basis of the averaged values, a relationship between one or more detected sensor signals and irradiation parameters B and permissible values for the other irradiation parameters has been determined for each subregion 40 for the respective fixed point 44.

Figure 5:
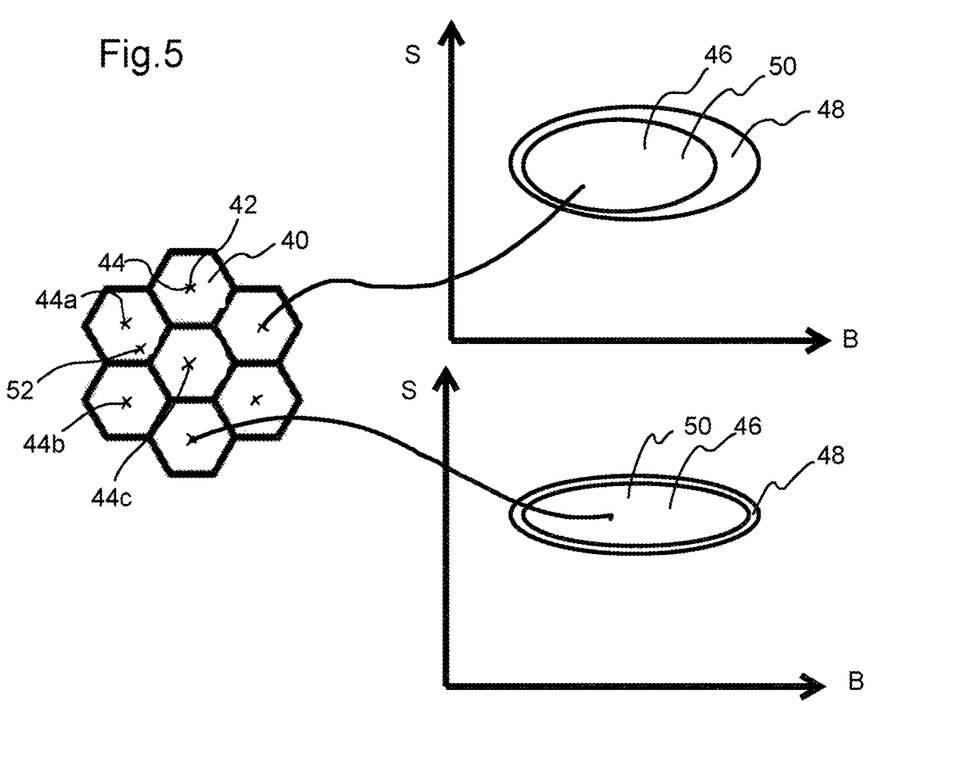
FIG. 5 shows a schematic plan view of a segment of the building zone of the manufacturing device, the individual subregions being allocated respective process windows, according to some embodiments.

FIG. 5 illustrates how the different subregions 40 or fixed points 44 are assigned different process windows 46. The subregions 40 allocate to a sensor signal S a set 48 of permissible irradiation parameters B and also a set 50 of irradiation parameters B that are preferably to be used.

If therefore a point 52 that does not lie on any of the fixed points 44 is to be irradiated in order to build up an object 34, the adjacently lying fixed points 44a, 44b and 44c are linearly interpolated by the process windows 46, and thus a process window 46 with permissible values for the point 52 is determined.

FIG. 6 illustrates that, for this interpolation of the respective fixed points 44a-44c surrounding the point 52, triangles 54a-54c set up in each case between the fixed points and the point 52 can be used as weightings of the fixed points 44a-44c. In this case, each of the fixed points 44a-44c is assigned the triangle 54a-54c lying opposite it with respect to the point 52. The fixed point 44a is therefore weighted with the area of the triangle 54a and the fixed point 44b is weighted with the area of the triangle 54b and the fixed point 44c is correspondingly weighted with the area of the triangle 54c.

The process window of the point 52 is consequently obtained in the present example from the sum of the respective products of the process windows of the fixed points 44a-44c multiplied by the areas of the triangles 54a-54c respectively weighting them, divided by the sum of the area of the triangles 54a-54c.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a manufacturing device for additive manufacturing of a three-dimensional object, the method comprising:

irradiating a respective subregion of a plurality of subregions within a building zone in which a beam of a beam source is directed onto a build material by a scanning unit, wherein an amount of energy introduced is chosen such that the build material is solidified, so that a part of the three-dimensional object to be manufactured is formed in the subregion, and for each respective point in the respective subregion being irradiated by the beam, controlling at least one irradiation parameter that characterizes the irradiation such that the irradiation parameter lies in a process window that changes location-dependently over an area of the building zone, wherein a respective predefined process window is defined for each respective subregion of the plurality of subregions, the respective predefined process window presets a relationship between a sensor signal detected by a sensor unit and permissible values for the irradiation parameter, wherein the process window for the respective point corresponds to the respective predefined process window defined for the respective subregion or to two or more predefined process windows defined for subregions nearest to the respective point, and wherein the predefined process window for each respective subregion is defined for a respective preset fixed point in the respective subregion, and the method further comprises, for the respective point that deviates from the preset fixed point, determining the process window for the respective point by linear interpolation of the two or more predefined process windows defined for the subregions nearest to the respective point.

2. The method as claimed in claim 1, wherein the process window that changes location-dependently over the area of the building zone additionally changes in dependence on types of the subregion in the area of the building zone.

3. The method as claimed in claim 2, wherein the types of the subregion in the area of the building zone comprise at one of: contour, upskin, downskin, or inskin, with predetermined heat dissipation properties.

4. The method as claimed in claim 3, wherein the build material comprises a powdered build material, and the types of the subregion in the area of the building zone relate to a number of layers of the powdered build material that have already solidified under the subregion.

5. The method as claimed in claim 3, wherein the types of the subregion in the area of the building zone relate to a form of a contour.

6. The method as claimed in claim 1, wherein the process window presets at least one of: a traversing speed of the laser beam, a power of the laser beam, a pulse duration of the laser beam, a beam diameter in dependence on the detected sensor signal.

7. The method as claimed in claim 1, wherein, during the irradiation, a number of irradiation parameters that characterize the irradiation is chosen locally such that each of the number of irradiation parameters lie in a respective process window that changes location-dependently over the area of the building zone, and
wherein the respective process window presets a relationship between the sensor signal detected by the sensor unit and the permissible values for the respective irradiation parameter.

8. The method as claimed in claim 1, wherein the manufacturing device comprises a number of sensor units,
a number of irradiation parameters that characterize the irradiation is chosen locally such that the irradiation parameters lie in the process windows that change location—dependently over the area of the building zone,
wherein the process windows preset a relationship between a number of sensor signals detected by the sensor units and permissible values for the irradiation parameters.

9. The method as claimed in claim 1, wherein the process window that changes location-dependently over the area of the building zone is formed while taking into account at least one machine parameter, wherein the machine parameter comprises at least one of:
an angle at which the beam impinges on the building zone,
characteristics of inert gas flows, including a speed, a volume, a homogeneity, or a type of inert gas of the inert gas flows,
a beam profile of the beam, including a projection of the beam onto a powder bed, or
calibration measurements on calibration components at positions of the fixed points.

10. The method as claimed in claim 1, wherein the process window that changes location-dependently over the area of the building zone is additionally formed while taking into account at least one parameter of the build material.

11. The method as claimed in claim 10, wherein the at least one parameter of the build material comprises at least one of: a chemical composition, an average grain size, or a grain size distribution.

12. The method as claimed in claim 1, wherein the process window presets the irradiation parameter in dependence on at least one sensor signal that characterizes a melt pool, sensor signals that characterize the melt pool being at least the local temperature at the momentarily irradiated point, the local temperature at a measuring point preceding the irradiated point, the local temperature at a measuring point following the irradiated point, the cooling profile of an already irradiated point and/or the heating behavior of a point toward which the irradiated point moves.

13. The method as claimed in claim 12, wherein the at least one sensor signal that characterizes the melt pool comprises at least one of: a local temperature at a momentarily irradiated point, a local temperature at a measuring point preceding the irradiated point, a local temperature at a measuring point following the irradiated point, a cooling profile of an already irradiated point, or heating behavior of a point toward which the irradiated point moves.

14. A method for creating a process window for additive manufacturing of three-dimensional objects, the method comprising:
building up a number of three-dimensional reference objects by applying layer by layer and selectively solidifying a build material within a building zone within each case at least one different irradiation parameter;
detecting and recording one or more irradiation parameters in dependence on an irradiated position on the building zone;
monitoring building operation by detecting sensor signals using one or more sensor units in dependence on the irradiated position on the building zone and recording of the sensor signals;
checking the reference objects;
dividing the building zone into a plurality of subregions;
averaging the detected irradiation parameters and the sensor signals over each respective subregion; and
for each respective subregion of the plurality of subregions, creating a respective process window by averaging the detected and recorded irradiation parameters and the sensor signals and also based on a result of the checking of the reference objects, the respective process window presetting a relationship between the sensor signals and permissible values for the irradiation parameter(s).

15. The method as claimed in claim 14, wherein the respective process window is for a fixed point with respect to a centroid of the respective subregion.

16. The method as claimed in claim 15, wherein, for the determination of the process window for each subregion, a number n of sensor signals are combined in an average-value vector of the length n, each entry of the vector corresponding to an average sensor signal that is averaged over the respective subregion.

17. The method of claim 16, wherein, for the determination of the process window for each subregion, a covariance matrix that describes a respective variance of each individual sensor signal of the average-value vector, and the respective covariances of the sensor signals in relation to one another are created in addition to the average-value vector.

18. The method as claimed in claim 1, wherein the sensor unit is configured as an on-axis sensor unit, and/or is designed as a sensor unit with a locationally fixed monitoring region.

19. The method as claimed in claim 1, wherein the sensor unit is configured for a locationally fixed monitoring region.

* * * * *